United States Patent
Kumar et al.

(10) Patent No.: US 8,943,575 B2
(45) Date of Patent: Jan. 27, 2015

(54) METHOD AND SYSTEM FOR POLICY SIMULATION

(75) Inventors: Srinivas Kumar, Cupertino, CA (US); Vijayashree S. Bettadapura, Campbell, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1063 days.

(21) Appl. No.: 12/432,186

(22) Filed: Apr. 29, 2009

(65) Prior Publication Data

US 2009/0276204 A1    Nov. 5, 2009

Related U.S. Application Data

(60) Provisional application No. 61/049,145, filed on Apr. 30, 2008.

(51) Int. Cl.
    *G06F 9/00*     (2006.01)
    *H04L 29/06*    (2006.01)

(52) U.S. Cl.
    CPC ................................. *H04L 63/0227* (2013.01)
    USPC ............................ 726/11; 726/13; 713/182

(58) Field of Classification Search
    USPC ...................... 726/1, 11, 13; 703/21; 713/782
    See application file for complete search history.

(56) References Cited

U.S. PATENT DOCUMENTS

| | | |
|---|---|---|
| 5,218,637 A | 6/1993 | Angebaud et al. |
| 5,757,916 A | 5/1998 | MacDoran et al. |
| 5,784,562 A | 7/1998 | Diener |
| 5,867,494 A | 2/1999 | Krishnaswamy et al. |
| 5,887,065 A | 3/1999 | Audebert |

(Continued)

FOREIGN PATENT DOCUMENTS

| | | |
|---|---|---|
| CA | 2286534 | 4/2001 |
| EP | 1 071 256 | 1/2001 |

(Continued)

OTHER PUBLICATIONS

Scarfone et ai, Guide to Intrusion Detection and Prevention Systems (IOPS), Feb. 2007, NIST, Special Publication 800-94.

(Continued)

*Primary Examiner* — Kambiz Zand
*Assistant Examiner* — Suman Debnath
(74) *Attorney, Agent, or Firm* — Foley & Lardner LLP; Christopher J. McKenna; Paul M. H. Pua

(57) ABSTRACT

A method and system for managing access to resources on a secured network is disclosed. The method includes reading packet information in respective packets of a packet communication received at a security node and applying one of the plurality of access rules. The method also includes determining whether the security node is to block the respective packets and/or the packet communication from reaching a resource on the secured network based on the applied access rule. If the security node is to block the respective packets and/or the packet communication, it is determined whether the applied access rule is a simulated access rule. Responsive to the applied access rule being a simulated access rule, the respective packets and/or the packet communication are passed towards the resource on the secured network and a log event is generated that indicates the security node blocked the respective packets and/or the packet communication.

22 Claims, 4 Drawing Sheets

(56) References Cited

U.S. PATENT DOCUMENTS

| | | | |
|---|---|---|---|
| 5,983,270 A * | 11/1999 | Abraham et al. ............ 709/224 |
| 5,987,611 A | 11/1999 | Freund |
| 5,999,525 A | 12/1999 | Krishnaswamy et al. |
| 6,021,495 A | 2/2000 | Jain et al. |
| 6,070,245 A | 5/2000 | Murphy et al. |
| 6,076,108 A | 6/2000 | Courts et al. |
| 6,105,136 A | 8/2000 | Cromer et al. |
| 6,141,758 A | 10/2000 | Benantar et al. |
| 6,145,083 A | 11/2000 | Shaffer et al. |
| 6,161,182 A | 12/2000 | Nadooshan |
| 6,170,019 B1 | 1/2001 | Dresel et al. |
| 6,199,113 B1 | 3/2001 | Alegre et al. |
| 6,219,669 B1 | 4/2001 | Haff et al. |
| 6,253,326 B1 | 6/2001 | Lincke et al. |
| 6,304,969 B1 | 10/2001 | Wasserman et al. |
| 6,335,927 B1 | 1/2002 | Elliott et al. |
| 6,345,291 B2 | 2/2002 | Murphy et al. |
| 6,393,569 B1 | 5/2002 | Orenshteyn |
| 6,418,472 B1 | 7/2002 | Mi et al. |
| 6,442,571 B1 | 8/2002 | Haff et al. |
| 6,452,915 B1 | 9/2002 | Jorgensen |
| 6,470,453 B1 | 10/2002 | Vilhuber |
| 6,473,794 B1 | 10/2002 | Guheen et al. |
| 6,480,967 B1 | 11/2002 | Jensen et al. |
| 6,502,192 B1 | 12/2002 | Nguyen |
| 6,510,350 B1 | 1/2003 | Steen et al. |
| 6,519,571 B1 | 2/2003 | Guheen et al. |
| 6,523,027 B1 | 2/2003 | Underwood |
| 6,535,917 B1 | 3/2003 | Zamanzadeh et al. |
| 6,536,037 B1 | 3/2003 | Barrese et al. |
| 6,594,589 B1 | 7/2003 | Coss, Jr. et al. |
| 6,601,233 B1 | 7/2003 | Underwood |
| 6,609,128 B1 | 8/2003 | Underwood |
| 6,615,166 B1 | 9/2003 | Guheen et al. |
| 6,633,878 B1 | 10/2003 | Underwood |
| 6,640,248 B1 | 10/2003 | Jorgensen |
| 6,704,873 B1 | 3/2004 | Underwood |
| 6,718,535 B1 | 4/2004 | Underwood |
| 6,721,713 B1 | 4/2004 | Guheen et al. |
| 6,725,269 B1 | 4/2004 | Megiddo |
| 6,731,625 B1 | 5/2004 | Eastep et al. |
| 6,735,691 B1 | 5/2004 | Capps et al. |
| 6,748,287 B1 | 6/2004 | Hagen et al. |
| 6,754,181 B1 | 6/2004 | Elliott et al. |
| 6,766,314 B2 | 7/2004 | Burnett |
| 6,785,692 B2 | 8/2004 | Wolters et al. |
| 6,826,616 B2 | 11/2004 | Larson et al. |
| 6,839,759 B2 | 1/2005 | Larson et al. |
| 6,850,252 B1 | 2/2005 | Hoffberg |
| 6,856,330 B1 | 2/2005 | Chew et al. |
| 6,870,921 B1 | 3/2005 | Elsey et al. |
| 6,909,708 B1 | 6/2005 | Krishnaswamy et al. |
| 6,944,279 B2 | 9/2005 | Elsey et al. |
| 6,947,992 B1 | 9/2005 | Shachor |
| 6,954,736 B2 | 10/2005 | Menninger et al. |
| 6,957,186 B1 | 10/2005 | Guheen et al. |
| 6,985,922 B1 | 1/2006 | Bashen et al. |
| 7,013,290 B2 | 3/2006 | Ananian |
| 7,039,606 B2 | 5/2006 | Hoffman et al. |
| 7,054,837 B2 | 5/2006 | Hoffman et al. |
| 7,072,843 B2 | 7/2006 | Menninger et al. |
| 7,096,495 B1 | 8/2006 | Warrier et al. |
| 7,100,195 B1 | 8/2006 | Underwood |
| 7,107,285 B2 | 9/2006 | Von Kaenel et al. |
| 7,120,596 B2 | 10/2006 | Hoffman et al. |
| 7,145,898 B1 | 12/2006 | Elliott |
| 7,149,698 B2 | 12/2006 | Guheen et al. |
| 7,149,803 B2 | 12/2006 | Douglis et al. |
| 7,160,599 B2 | 1/2007 | Hartman |
| 7,165,041 B1 | 1/2007 | Guheen et al. |
| 7,171,379 B2 | 1/2007 | Menninger et al. |
| 7,188,138 B1 | 3/2007 | Schneider |
| 7,188,180 B2 | 3/2007 | Larson et al. |
| 7,194,552 B1 | 3/2007 | Schneider |
| 7,331,061 B1 | 2/2008 | Ramsey et al. |
| 7,334,125 B1 | 2/2008 | Pellacuru |
| 7,353,533 B2 | 4/2008 | Wright et al. |
| 7,363,347 B2 | 4/2008 | Thomas |
| 7,386,889 B2 | 6/2008 | Shay |
| 7,398,552 B2 | 7/2008 | Pardee et al. |
| 7,430,760 B2 | 9/2008 | Townsend et al. |
| 7,509,687 B2 | 3/2009 | Ofek et al. |
| 7,519,986 B2 | 4/2009 | Singhal |
| 7,567,510 B2 | 7/2009 | Gai et al. |
| 7,593,529 B1 | 9/2009 | Yang |
| 7,596,803 B1 | 9/2009 | Barto et al. |
| 7,637,147 B2 | 12/2009 | Lee et al. |
| 7,644,434 B2 | 1/2010 | Pollutro et al. |
| 7,660,902 B2 | 2/2010 | Graham et al. |
| 7,660,980 B2 | 2/2010 | Shay et al. |
| 7,770,223 B2 * | 8/2010 | Shevenell et al. ............... 726/23 |
| 7,877,601 B2 | 1/2011 | Smith et al. |
| 7,978,700 B2 | 7/2011 | Kopelman et al. |
| 8,412,838 B1 | 4/2013 | Wang et al. |
| 2001/0020195 A1 | 9/2001 | Patel et al. |
| 2001/0052012 A1 | 12/2001 | Rinne et al. |
| 2001/0054044 A1 | 12/2001 | Liu et al. |
| 2001/0054147 A1 | 12/2001 | Richards |
| 2002/0002577 A1 | 1/2002 | Garg et al. |
| 2002/0022969 A1 | 2/2002 | Berg et al. |
| 2002/0029086 A1 | 3/2002 | Ogushi et al. |
| 2002/0062367 A1 | 5/2002 | Debber et al. |
| 2002/0077981 A1 | 6/2002 | Takatori et al. |
| 2002/0078015 A1 | 6/2002 | Ponnekanti |
| 2002/0080822 A1 | 6/2002 | Brown et al. |
| 2002/0083183 A1 | 6/2002 | Pujare et al. |
| 2002/0116643 A1 | 8/2002 | Raanan et al. |
| 2002/0133723 A1 | 9/2002 | Tait |
| 2002/0146026 A1 | 10/2002 | Unitt et al. |
| 2002/0146129 A1 | 10/2002 | Kaplan |
| 2002/0184224 A1 | 12/2002 | Haff et al. |
| 2002/0193966 A1 | 12/2002 | Buote et al. |
| 2003/0005118 A1 | 1/2003 | Williams |
| 2003/0005300 A1 | 1/2003 | Noble et al. |
| 2003/0009538 A1 | 1/2003 | Shah et al. |
| 2003/0023726 A1 | 1/2003 | Rice et al. |
| 2003/0033545 A1 | 2/2003 | Wenisch et al. |
| 2003/0055962 A1 | 3/2003 | Freund et al. |
| 2003/0063750 A1 | 4/2003 | Medvinsky et al. |
| 2003/0083991 A1 | 5/2003 | Kikinis |
| 2003/0084350 A1 | 5/2003 | Eibach et al. |
| 2003/0171885 A1 | 9/2003 | Coss et al. |
| 2003/0179900 A1 | 9/2003 | Tian et al. |
| 2003/0200439 A1 | 10/2003 | Moskowitz |
| 2003/0204421 A1 | 10/2003 | Houle et al. |
| 2003/0208448 A1 | 11/2003 | Perry et al. |
| 2003/0208562 A1 | 11/2003 | Hauck et al. |
| 2003/0217126 A1 | 11/2003 | Polcha et al. |
| 2003/0217166 A1 | 11/2003 | Dal Canto et al. |
| 2003/0220768 A1 | 11/2003 | Perry et al. |
| 2003/0220821 A1 | 11/2003 | Walter et al. |
| 2004/0006710 A1 | 1/2004 | Pollutro et al. |
| 2004/0022191 A1 | 2/2004 | Bernet et al. |
| 2004/0024764 A1 | 2/2004 | Hsu et al. |
| 2004/0031058 A1 | 2/2004 | Reisman |
| 2004/0049515 A1 | 3/2004 | Haff et al. |
| 2004/0107342 A1 | 6/2004 | Pham et al. |
| 2004/0107360 A1 | 6/2004 | Herrmann et al. |
| 2004/0111410 A1 | 6/2004 | Burgoon et al. |
| 2004/0139313 A1 | 7/2004 | Buer et al. |
| 2004/0142686 A1 | 7/2004 | Kirkup et al. |
| 2004/0193606 A1 | 9/2004 | Arai et al. |
| 2004/0193912 A1 | 9/2004 | Li et al. |
| 2004/0214576 A1 | 10/2004 | Myers et al. |
| 2004/0228362 A1 | 11/2004 | Maki et al. |
| 2004/0230797 A1 | 11/2004 | Ofek et al. |
| 2005/0010528 A1 | 1/2005 | Pelz et al. |
| 2005/0015624 A1 | 1/2005 | Ginter et al. |
| 2005/0027788 A1 | 2/2005 | Koopmans et al. |
| 2005/0038779 A1 | 2/2005 | Fernandez et al. |
| 2005/0132030 A1 | 6/2005 | Hopen et al. |
| 2005/0185647 A1 | 8/2005 | Rao et al. |
| 2005/0265351 A1 | 12/2005 | Smith et al. |
| 2005/0283822 A1 | 12/2005 | Appleby et al. |

(56) References Cited

U.S. PATENT DOCUMENTS

| | | | |
|---|---|---|---|
| 2006/0005240 A1 | 1/2006 | Sundarrajan et al. | |
| 2006/0068755 A1 | 3/2006 | Shraim et al. | |
| 2006/0075464 A1 | 4/2006 | Golan et al. | |
| 2006/0080441 A1 | 4/2006 | Chen et al. | |
| 2006/0080667 A1* | 4/2006 | Sanghvi et al. | 719/310 |
| 2006/0090196 A1 | 4/2006 | Van Bemmel et al. | |
| 2006/0198394 A1 | 9/2006 | Gotoh et al. | |
| 2006/0218273 A1 | 9/2006 | Melvin | |
| 2006/0245414 A1 | 11/2006 | Susai et al. | |
| 2006/0248580 A1* | 11/2006 | Fulp et al. | 726/11 |
| 2006/0271652 A1 | 11/2006 | Stavrakos et al. | |
| 2006/0274774 A1 | 12/2006 | Srinivasan et al. | |
| 2006/0277275 A1 | 12/2006 | Glaenzer | |
| 2006/0277591 A1 | 12/2006 | Arnold et al. | |
| 2006/0282545 A1 | 12/2006 | Arwe et al. | |
| 2006/0282876 A1* | 12/2006 | Shelest et al. | 726/1 |
| 2007/0038618 A1 | 2/2007 | Kosciusko et al. | |
| 2007/0061434 A1 | 3/2007 | Schmieder et al. | |
| 2007/0113269 A1 | 5/2007 | Zhang | |
| 2007/0136317 A1 | 6/2007 | Przywara | |
| 2007/0192853 A1 | 8/2007 | Shraim et al. | |
| 2007/0271592 A1 | 11/2007 | Noda et al. | |
| 2007/0283014 A1 | 12/2007 | Shinomiya et al. | |
| 2007/0294762 A1 | 12/2007 | Shraim et al. | |
| 2007/0299915 A1 | 12/2007 | Shraim et al. | |
| 2008/0005779 A1 | 1/2008 | Takenaka et al. | |
| 2008/0008202 A1 | 1/2008 | Terrell et al. | |
| 2008/0215889 A1 | 9/2008 | Celik et al. | |
| 2009/0158384 A1 | 6/2009 | Kanade et al. | |
| 2009/0210364 A1 | 8/2009 | Adi et al. | |
| 2010/0037284 A1 | 2/2010 | Sachs | |
| 2010/0223222 A1 | 9/2010 | Zhou et al. | |
| 2010/0235879 A1 | 9/2010 | Burnside et al. | |
| 2011/0280215 A1 | 11/2011 | Nakagawa et al. | |
| 2012/0051529 A1 | 3/2012 | Dobbins et al. | |
| 2012/0096513 A1 | 4/2012 | Raleigh et al. | |
| 2012/0304277 A1 | 11/2012 | Li et al. | |

FOREIGN PATENT DOCUMENTS

| | | |
|---|---|---|
| EP | 1 418 730 | 5/2004 |
| EP | 1 641 215 | 3/2006 |
| JP | 06-097905 | 4/1994 |
| JP | 06097905 | 8/1994 |
| JP | 11-205388 | 7/1999 |
| JP | 11205388 A | 7/1999 |
| JP | 2001306521 | 2/2001 |
| JP | 2001-306521 | 11/2001 |
| JP | 2003-008651 | 1/2003 |
| JP | 2003008651 | 10/2003 |
| WO | WO-01/33759 | 5/2001 |
| WO | WO-01/38995 | 5/2001 |
| WO | WO-02/079949 | 10/2002 |
| WO | WO-2005/066737 | 7/2005 |

OTHER PUBLICATIONS

Aleksander Svelokken, "Biometric Authentication and Identification Using Keystroke Dynamics With Alert Levels", Master Thesis (Retrieved from University of Oslo), May 23, 2007, pp. 1-124.
Darryle Merlette, Dr. Parag Pruthi; Network Security; NetDetector: Identifying Real Threats and Securing Your Network; Copyright © 2003 NIKSUN, Inc., Monmouth Junction NJ, USA.
Darryle Merlette; Spencer Parker, Dr. Parag Pruthi; Niksun Network Security; NetDetector: Monitoring and Minimizing Instant Messaging Risks; Copyright © 2003 NIKSUN, Inc., Monmouth Junction NJ, USA.
International Search Report for International Application No. PCT/US2004/043405; Completed Mar. 15, 2005; Mailed Mar. 23, 2005.
International Search Report for International Application No. PCT/US2008/007984; Completed Aug. 22, 2009; Mailed Sep. 3, 2009.
Office Action for JP App. No. 2006-547397 dated Jul. 5, 2011.
Office Action for JP App. No. 2006-547397 dated Nov. 30, 2010.
Office Action for U.S. Appl. No. 10/423,444 dated Dec. 2, 2008.
Office Action for U.S. Appl. No. 10/423,444 dated Feb. 25, 2009.
Office Action for U.S. Appl. No. 10/423,444 dated Jun. 13, 2006.
Office Action for U.S. Appl. No. 10/423,444 dated Mar. 12, 2007.
Office Action for U.S. Appl. No. 10/423,444 dated Sep. 7, 2007.
Office Action for U.S. Appl. No. 10/423,444 dated Mar. 14, 2008.
Office Action, for U.S. Appl. No. 10/423,444 dated Sep. 19, 2008.
Office Action for U.S. Appl. No. 10/583,578 dated Jun. 24, 2010.
Office Action for U.S. Appl. No. 10/583,578 dated Feb. 11, 2011.
Office Action for U.S. Appl. No. 10/583,578 dated Jul. 19, 2011.
Office Action for U.S. Appl. No. 12/267,804 dated Aug. 16, 2011.
Office Action for U.S. Appl. No. 12/267,804 dated Apr. 25, 2011.
Office Action for U.S. Appl. No. 12/270,278 dated Jun. 24, 2011.
Office Action for U.S. Appl. No. 12/406,613 dated Oct. 24, 2011.
Office Action for U.S. Appl. No. 12/163,292 dated Aug. 8, 2011.
Notice of Allowance for U.S. Appl. No. 10/423,444 dated Nov. 16, 2009.
Notice of Allowance on U.S. Appl. No. 10/583,578 dated Mar. 27, 2012.
Office Action for U.S. Appl. No. 10/423,444 dated Jul. 27, 2009.
Office Action on U.S. Appl. No. 12/267,804 dated Apr. 10, 2012.
Office Action on U.S. Appl. No. 12/267,850 dated Jun. 14, 2012.
Office Action on U.S. Appl. No. 12/270,278 dated Nov. 9, 2011.
Office Action on U.S. Appl. No. 12/406,613 dated Mar. 20, 2012.
Written Opinion of the International Search Authority for PCT Application No. PCT/US2004/043405; Completed Mar. 15, 2005; Mailed Mar. 23, 2005.
Office Action on U.S. Appl. No. 12/267,850 dated Nov. 7, 2012.
US Notice of Allowance on U.S. Appl. No. 12/267,804 dated Apr. 24, 2013.
US Office Action on U.S. Appl. No. 12/163,292 dated Feb. 2, 2011.
US Office Action on U.S. Appl. No. 12/267,804 dated Sep. 27, 2012.
US Office Action on U.S. Appl. No. 12/267,850 dated Mar. 26, 2013.
Office Action for U.S. Appl. No. 12/267,850 dated Nov. 7, 2012.
US Notice of Allowance for U.S. Appl. No. 12/163,292 dated Aug. 6, 2014.
US Notice of Allowance for U.S. Appl. No. 12/267,804 dated Apr. 24, 2013.
US Office Action for U.S. Appl. No. 12/270,278 dated Feb. 20, 2014.
US Office Action for U.S. Appl. No. 12/163,292 dated Apr. 25, 2014.
US Office Action for U.S. Appl. No. 12/267,804 dated Sep. 27, 2012.
US Office Action for U.S. Appl. No. 12/267,850 dated Mar. 26, 2013.
US Office Action for U.S. Appl. No. 12/267,850 dated Sep. 30, 2013.
US Office Action for U.S. Appl. No. 12/270,278 dated Aug. 15, 2014.
US Office Action for U.S. Appl. No. 12/406,613 dated Jun. 9, 2014.
US Office Action for U.S. Appl. No. 10/583,578 dated Feb. 2, 2011.
U.S. Notice of Allowance for U.S. Appl. No. 12/270,278 dated Nov. 14, 2014.
U.S. Notice of Allowance for U.S. Appl. No. 12/267,850 dated Nov. 6, 2014.

* cited by examiner

METHOD AND SYSTEM FOR POLICY SIMULATION

CROSS REFERENCE TO RELATED APPLICATIONS

This application claims the benefit of U.S. Provisional Application No. 61/049,145, filed Apr. 30, 2008, entitled "Policy Simulation Using Security Tags Embedded In Data Packets", the contents of which are hereby incorporated by reference.

FIELD OF THE INVENTION

This invention relates to computer system security and, more particularly, to a system and method for policy simulation.

BACKGROUND OF THE INVENTION

A secured computer network uses one or more security gateways to limit user access to protected network resources located behind the gateways. System administrators typically manage those gateways through a central gateway administration console using access rules (or policies).

SUMMARY OF THE INVENTION

The present invention is embodied as a method and system for managing access to resources on a secured network using a plurality of access rules. The method includes reading packet information in respective packets of a packet communication received at a security node and applying one of the plurality of access rules. The method also includes determining whether the security node is to block the respective packets and/or the packet communication from reaching a resource on the secured network based on the applied access rule. If the security node is to block the respective packets and/or the packet communication from reaching the resource based on the applied access rule, it is determined whether the applied access rule is a simulated access rule. Responsive to the applied access rule being a simulated access rule, the respective packets and/or the packet communication are passed towards the resource on the secured network and a log event is generated that indicates the security node blocked the respective packets and/or the packet communication.

The present invention is also embodied as another method and system. This method includes reading packet information in respective packets of a packet communication received at a security node and applying, by a program processor of the security node, a simulated access rule. The method also includes determining, by the program processor of the security node, whether the packet communication is authorized for one or more resources on the secured network using the packet information in at least one of the respective packets and the applied, simulated access rule. Responsive to the packet communication not being authorized by the simulated access rule, a log event is generated indicating that the packet communication is simulated to be blocked by the security node.

The present invention is also embodied as a further method and system for simulating an effect of access policies for managing access to a resource on a protected network. The method includes an administrator generating a simulated rule or a set of simulated rules having a precedence order. The method also includes authorizing use of the simulated rule or set of simulated rules at an enforcement point and generating log events at the enforcement point including: (1) simulating blocking of respective packets when the simulated rule or set of simulated rules provide for blocking of the respective data packets; or (2) simulating transmission of respective packets when the simulated rule or set of simulated rules provide for access to the resource. An amount of over-blocking or under-blocking is determined by analyzing the generated log events. The method further includes changing either the precedence order or the simulated rule to reduce an amount of over-blocking or under-blocking and placing the simulated rule into service on the enforcement point as an actual rule.

The present invention is also embodied as a security node for managing access to resources on a secured network using a plurality of access rules. The security node includes a packet processor module for reading packet information in respective packets of a packet communication received at the security node, a rule enforcement unit for applying the plurality of access rules in a precedence order and for determining whether the security node is to block the respective packets or the packet communication from reaching one or more resources on the secured network based on an applied access rule, and an event logger for generating log events. If the security node is to block the respective packets or the packet communication from reaching the one or more resources, the rule enforcement unit determines whether the applied access rule is a simulated access rule, and responsive to the applied access rule being the simulated access rule: (1) the packet processor module passes the respective packets and/or the packet communication towards the one or more resources on the secured network; and (2) the event logger generates a respective log event that indicates blocking of the respective packets and/or the packet communication by the security node.

BRIEF DESCRIPTION OF THE DRAWINGS

The invention is best understood from the following detailed description when read in connection with the accompanying drawings. According to common practice, various features/elements of the drawings may not be drawn to scale. Common numerical references represent like features/elements. The following figures are included in the drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
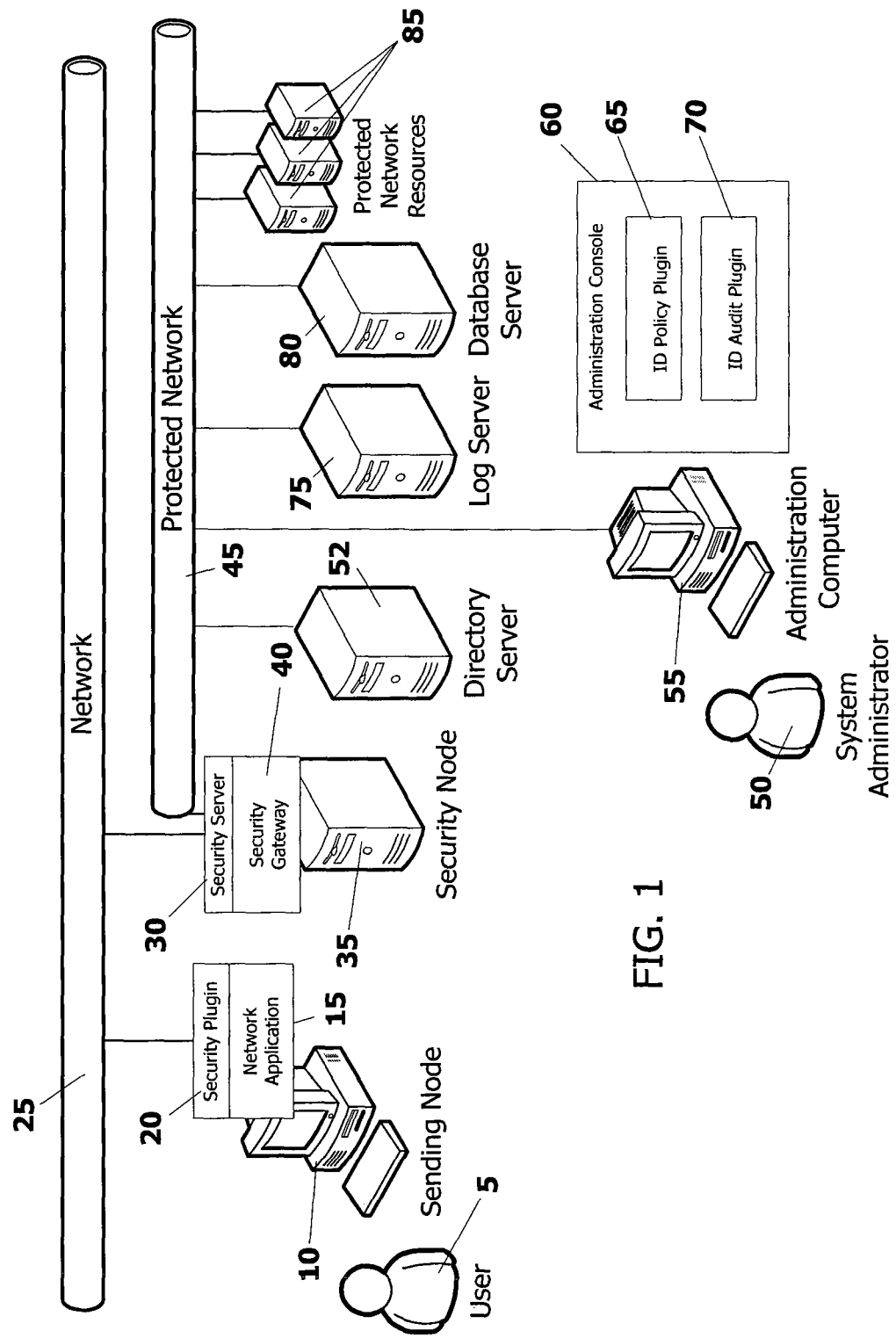
FIG. 1 is a schematic diagram illustrating an exemplary network including a sending node, a security node and a directory server in accordance with various exemplary embodiments of the invention.

FIG. 1 is a schematic diagram illustrating an exemplary network including a sending node 10, a security node 35 and a directory server 52 in accordance with various exemplary embodiments of the invention.

Referring to FIG. 1, a user 5 may operate a sending node 10, which may be a personal computer or other computing device. Sending node 10 may have an operating system (OS) or network application 15 for execution thereon that allows sending node 10 to communicate via a network 25 with other devices.

In certain exemplary embodiments, a security Plugin 20 that may run within OS 15 may examine (analyze) and/or may modify packets sent by sending node 10. Security Plugin 20 may be an application program, may be another program or may be a hardware module executing on sending node 10. Security Plugin 20 may insert a security tag into a portion or all of the packets sent by sending node 10.

A security node 35 may be a gateway device to a protected network 45 of network 25 that may connect to one or more protected network resources 85, such as web servers, database servers, and/or other services that user 5 may desire to access. A security gateway 40 (e.g., a program or a hardware module) may run on security node 35. A security server 30 may run as part of security gateway 40 to examine and/or modify incoming packets and may communicate with sending node 10 via network 25.

Although security Plugin 20 and security server 30 are illustrated in the network application and security gateway, respectively, security Plugin 20 and security server 30 may be provided in any device on the network or sub-network that interacts with the stream of packets being secured.

Although security node 35 is illustrated as a gateway device, it is contemplated that the operations of security node 35 may be included in a router device, a bridge device or a virtualized (hypervisor) platform.

Directory server 52 may be on protected network 45 or may reside anywhere so long as directory server 52 is in operative communications with security node 35. Directory server 52 may manage and store access policies (access rules) for determining whether specific users or user groups may access one or more protected network resources 85 and/or specific applications residing on protected network 45.

Although a directory server 52 is illustrated, it is contemplated that any computing platform in communication with security node 35, or security node 35, itself, may provide the functions of directory server 52.

Log server 75 may report or log access activity that includes successful and unsuccessful user attempts to use protected network resources 85, or applications residing on protected network 45. Log server 75 may report such activities as event logs that include a record of each access attempt. Log server 30 may use one or more event logs to summarize resource usage and store the summary in one or more behavior logs. The log server 30 may store the event logs and/or the behavior logs in a database server 80 where other network entities may access the event and/or behavior logs.

Although separate servers are shown for the directory, log and database servers, it is contemplated that some or all of these servers may be combined.

Although one security node, one directory server and one log server are shown, it is contemplated that more than one of these devices are possible for each network 25 and/or protected network 45.

Security node 35 may generate via event logger 35-5 (see FIG. 2) event logs and may send them to log server 75. Log server 75 may be a centralized storage device that communicates with a plurality of security nodes. Log server 75 may parse the event logs and may archive event information in a database or table (e.g., a relational database). Security node 35, log server 75 and/or administration computer 55 may use the event logs to generate (infer) behavior logs. The behavior logs may include a summary of resource usage patterns from the event logs and may identify, for example, each user that gained access to a specific protected resource and/or each user that was blocked from gaining access to a specific protected resource.

A system administrator (SA) 50 may use an administration console 60 to specify access through each security node 35 (e.g., setup one or more access rules or access policies). That is, administration console 60 may be configured to maintain a set of policies that define access rules for protected network resources 85 behind (protected by) security node 35. Each policy may specify: (1) an entity allowed or denied access (such as a user or a user group); (2) a requested resource (a web server, a data server, a database server or an application, for example); (3) a security node through which access occurs; (4) the authentication type, and the effective dates and times for the access rule, among others. An access rule's scope may cover a single entity, a set of entities, or all entities. The access rule may be placed into operation as either a currently active access rule or as a simulated access rule that does not actually block access by a user to a protected resource and that generates log events as if the user was actually blocked from access to the protected resource.

SA 50 may create each access rule that security node 35 enforces. SA 50 may define each access rule attribute of an access rule to create adaptive access rules. In certain exemplary embodiments, SA 50 may create one or more simulated access rule, for example, when security node 35 is first installed inline along the data path and/or when a protected network resource 85 is initially installed or initially protected by security node 35. SA 50 may create needs-based and role-based access rules after the system is in-place by examining reports generated through administration console 60. These reports may be based on log events maintained by log server 75.

In certain exemplary embodiments, SA 50 may define a set of access rule outcomes (expected access grants or expected access blocks) that generate log events. In various exemplary embodiments, administration console 60 via ID Policy Plugin 65 and ID audit Plugin 70 may automatically (without SA or user intervention) analyze the actual log events to determine discrepancies between expected access rule outcomes and the actual access rule outcomes in the generated log events. Administration console 60 may present the determined discrepancies and may also present, based on either a modification of one or more access rules or a change in precedence order of the existing set of access rules 60, recommended changes to the access rules for approval by SA 50. ID audit Plugin 65 may retrieve event and behavior logs from database server 35 or log server 75 so that SA 50 may view them. ID policy Plugin 70 may store access rules in directory server 65, may read access rules from directory server 65, and may automatically or with SA 50 intervention create, edit, and/or manage access rules, for example, based on a set of expected outcomes provided by SA 50.

Although the analysis of discrepancies and recommendation of changes to the existing access rules are illustrated as automated operations, it is contemplated that SA 50 may modify access rules based on log event information presented at administration console 60. For example, SA 50 may determine when desired access is denied and when undesired access is granted. SA 50 may refine access rules to adjust (e.g., control) access appropriately. SA 50 via administration console 60 may control storage of each access rule on directory server 52 such that security nodes 35 may read the access rules and enforce them.

Figure 2:
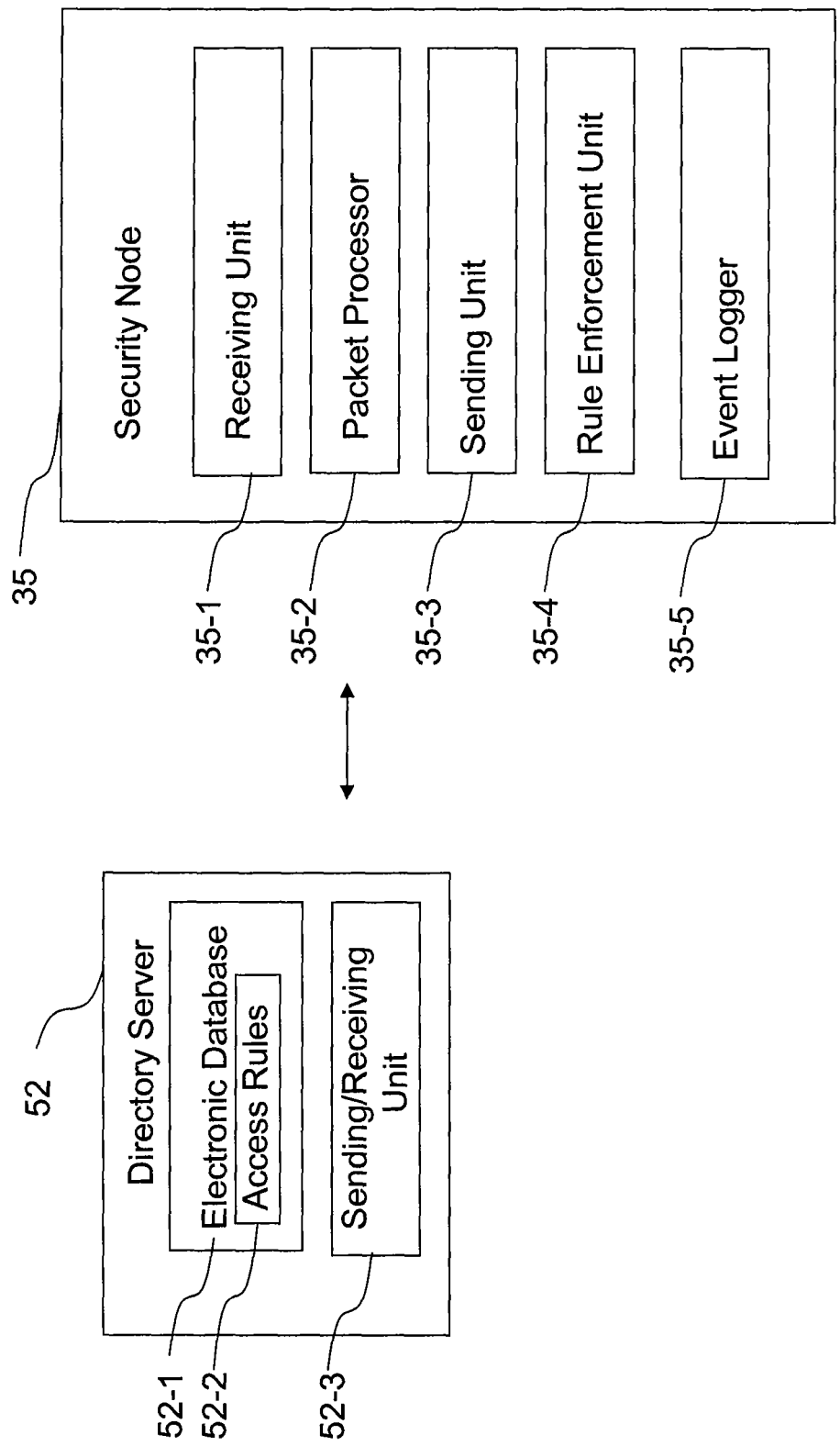
FIG. 2 is a block diagram illustrating the security node and directory server of FIG. 1.

FIG. 2 is a block diagram illustrating the security node and directory server of FIG. 1.

Referring to FIG. 2, directory server 52 may include: (1) an electronic database 52-1, which stores simulated access rules and currently active access rules 52-2, and a sending/receiving unit 52-3. Directory server 52 may store the access rules (policies) generated either automatically or via SA 50 using administrator console 60. These access rules/polices that are stored on directory server 52 may be authorized by SA 50 as either simulated access rules or as currently active access rules.

Security node 35 may include a receiving unit 35-1, a packet processor 35-2, a sending unit 35-3, a rule enforcement unit 35-4 and an event logger 35-5. Receiving unit 35-1 may receive packets of a packet communication from sending node 10. Some or all of the packets may include an embedded security tag including packet information, for example, a user identifier, a client identifier and/or an application identifier, among others. Packet processor 35-2 may extract, decrypt and read the packet information. For example, packet processor 35-2 may scan for embedded security tag or security information in each of the packets received by security node 35 and may extract, decrypt and read the inserted security tag or security information from the received packets.

Rule enforcement unit 35-4 may compare the packet information with one or more access rules retrieved from directory server 52 or internally stored in security node 35. The one or more access rules associated with the specific security node 35 may have a precedence order. Rule enforcement unit 35-4 may compare each access rule in precedence order to respective packet information from one packet, a plurality of packets or all packets associated with a packet communication to determine if the rule applies to the one packet, the plurality of packets of all of the packets, respectively. If the access rule applies (e.g., the packet information matches the criteria in the access rule by, for example, the packet information being associated with User A and the access rule covering User A), the one packet, the plurality of packets or the packet communication may be: (1) passed towards protected network resource 85; or (2) blocked from reaching the protected network resource 85 in accordance with the applied access rule.

In some exemplary embodiments, rule enforcement unit 35-4 may determine the application identifier and/or the user identifier inserted in each received packet, and may manage packet flow of each received packet based at least in part on the inserted application identifier and/or the inserted user identifier in each received packet in accordance with the applied access rule.

Event logger 35-5 may generate log events. In one example, if the rule enforcement unit 35-4 determines that security node 35 is to block the respective packets or the packet communication from reaching protected network resource based on the applied access rule and that the applied access rule is a simulated access rule, packet processor 35-2 may pass the respective packets or the packet communication towards protected network resource 85 on protected network 45 and event logger 35-5 may generate a respective log event that indicates blocking of the respective packets or the packet communication by security node 35. In a second example, if the rule enforcement unit 35-4 determines that security node 35 is to pass the respective packets or the packet communication toward protected network resource based on the applied access rule and that the applied access rule is a simulated access rule, packet processor 35-2 may pass the respective packets or the packet communication towards protected network resource 85 on protected network 45 and event logger 35-5 may generate a respective log event that indicates passing of the respective packets or the packet communication by security node 35.

Event logger 35-5 may generate event logs that may include information identifying, for example: (1) a particular application identifier corresponding to a registered application invoked by the user to access a resource; (2) a particular user identifier; (3) a client identifier; (4) an access rule identifier; (5) a time/date stamp; (6) a simulation flag; and/or (7) other information to identify an origin and a destination of some or all of the respective packets of the packetized communication.

The term log event as used herein is intended to refer to a broad class of transaction type records used for recording secure transactions between processing resources. These records may be transaction, event, summary and/or behavioral log records, among others.

Figure 3:
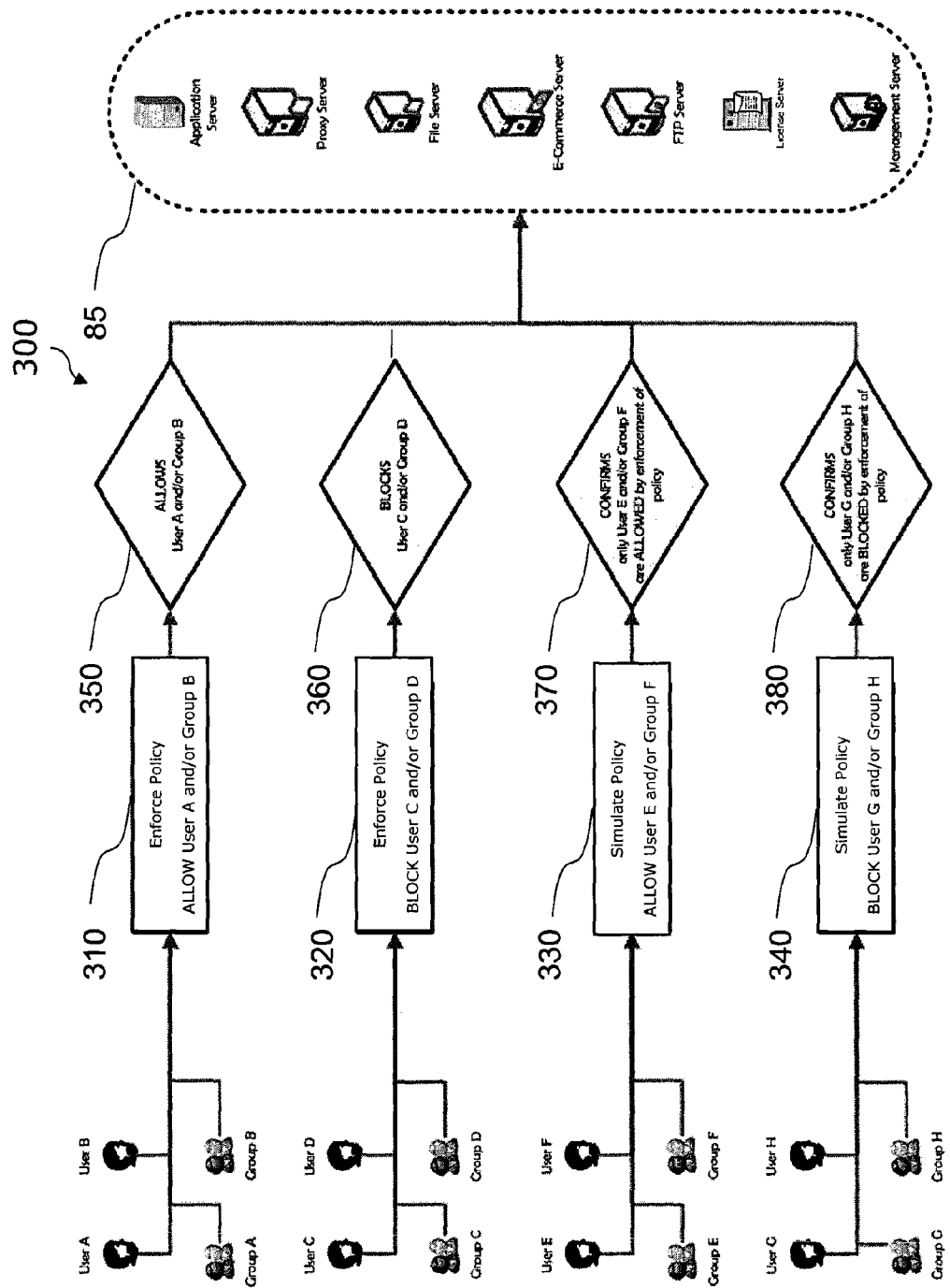
FIG. 3 is a diagram illustrating an exemplary policy enforcement schema that includes policy simulation for managing access to protected resources in accordance with an exemplary embodiment of the invention.

FIG. 3 is a diagram illustrating an exemplary policy enforcement schema that includes policy simulation for managing access to protected resources in accordance with an exemplary embodiment of the invention.

Referring to FIG. 3, exemplary policy enforcement schema 300 may selectively allow or selectively deny access to Users A-H and/or User Groups A-H for protected network resources (or protected applications thereon) 85. Users A-H refer to personnel that are identified in access policies (access rules). User Groups A-H refer to groups, as access entities, defined by specific users (e.g., Users A-H) that are identified in the access policies (rules). Access policies refers to access rules used to determine whether, for example, a packet, a plurality of packets or a packet communication associated with a user may access one or more protected network resources 85. The determination may be based on packet information embed within the packet, the plurality of packets, or the packet communication.

At least four different types of access rules may exist and may include (1) currently active allow access rule type 310 used for allowing access to one or more protected network resources 85; (2) currently active block access rule type 320 used for blocking access to one or more protected network resources 85; (3) simulated allow access rule type 330 used for simulating allowance of access to one or more protected network resources 85; and (4) simulated block access rule type 340 used for simulating blockage of access to one or more protected network resources 85.

If a user is defined within a User Group (e.g., User Group A) and attempts to access protected network resource 85, an access rule may allow access if either the user or the user group associated with the user is allowed access to access protected network resource 85 by security node 35 based on the access rule type 310, 320 or 330. Alternatively, if the user or the User Group associated with the user is included in an access rule of the currently active block access rule type, the user attempting to access one or more of the protected network resource 85 may be blocked from accessing protected network resource 85 by security node 35 in accordance with the currently active access rule.

Exemplary policy enforcements schema 300 includes currently active access rules. In a first example, User A and/or User Group B may be defined in a currently active access rule 310 as being permitted (allowed) access to protected network resources 85. When User A or any user defined in User Group B attempts to access protected network resources 85, security node 35 may compare User A or any user defined in User Group B with criteria in currently active access rule 310. At block 350, security node 35 may allow access to protected network resource 85 and may generate an allow action log event in accordance with the type of access rule.

In a second example, User C and/or User Group D may be defined in a currently active access rule 320 as being denied (blocked from) access to protected network resources 85. When User C or any user defined in User Group D attempts to access protected network resources 85, security node 35 may compare User C or any user defined in User Group D with criteria in currently active access rule 320. At block 360, security node 35 may block access to protected network resources 85 and may generate a block action log event in accordance with the type of access rule.

Exemplary policy enforcements schema 300 also includes simulated access rules. In a third example, User E and/or User Group F may be defined in a simulated access rule 330 as being permitted (allowed) access to protected network resources 85. When User E or any user defined in User Group F attempts to access protected network resources 85, security node 35 may compare User E or any user defined in User Group F with criteria in simulated access rule 330. At block 370, security node 35 may allow access to protected network resources 85 and may generate a simulated allow action log event in accordance with the type of access rule. That is, a packet of a packet communication, a portion of the packets associated with the packet communication or the packet communication may be identified in a log file to have been simulated to be passed towards protected network resources 85.

In a fourth example, User G and/or User Group H may be defined in a simulated access rule 340 as being denied (blocked from) access to protected network resources 85. When User G or any user defined in User Group H attempts to access protected network resources 85, security node 35 may compare User G or any user defined in User Group H with criteria in simulated access rule 340. At block 380, security node 35 may allow access to protected network resources 85 and may generate a simulated block action log event in accordance with the type of access rule. That is, a packet associated with a packet communication, a portion of the packets associated with the packet communication or the packet communication may be passed towards protected network resources 85 and may be identified in a log file to have been simulated to be blocked by security node 35 from reaching protected network resources 85.

Because access rules 330 and 340 are simulated, application of the simulated access rules may generate a log event showing simulated action (e.g., allowing access for access rule 330 and blocking access for access rule 340). For simulated access rule 340, even when the simulated access rule simulates a blockage of access for User G and/or any user associated with User Group H, actual access to protected network resources 85 is allowed by security node 35.

Although the currently active access rules 310 and 320 and the simulated access rules 330 and 340 are shown to provide access to protected network resources 85, collectively, it is contemplated that such access rules may selectively provide access to one protected network resource 85, a portion of the protected network resources 85 or all of the protected network resources 85. For example, each access rule may identify which resources are associated therewith.

Exemplary policy enforcement schema 300 illustrates access rules 310, 320, 330 and 340. A precedence order for access rules 310, 320, 330 and 340 may be established either automatically (without SA 50) or by SA 50. That is, the precedence order for access rules 310, 320, 330 and 340 may be currently active allow access rule 310, currently active block access rule 320, simulated allow access rule 330 and simulated block access rule 340, in that order. In the fourth example (described above), security node 35 may attempt to apply access rules in precedence order (e.g., access rules 310, 320, 330 and 340, in that order) to User G or a user defined in User Group H. Because the criteria associated with access rules, 310, 320 and 330 is not applicable to User G or any user defined in User Group H, access rules 310, 320 and 330 are not be applied and may be skipped. Access rule 340, which may be next in precedence order, may be applied based on simulated access rule 340 pertaining, for example, to User G.

Over-blocking generally refers to situations in which appropriate access to a protected resource is blocked by provisioned access rules. Under-blocking generally refers to situations in which an inappropriate access to a protected resource is not blocked by the provisioned access rules. These situations may be unintended consequences of the provisioned access rules. The effectiveness of access rules may be determined in accordance with: (1) an amount of over-blocking and/or under-blocking; and/or (2) one or more rates associated with over-blocking and/or under-blocking. Policy simulation may provide a means for measuring one or more percentages (rates) associated with under-blocking and/or over-blocking non-intrusively in production environments. Such policy simulation may reduce or eliminate negative consequences of experimentation with provisioned access rules, for example, in mission critical network environments.

Policy (access rule) simulation may allow for an evaluation of access to a specific resource by a user or user group defined within (that is the principle target of) an access rule based on specific criteria in the access rule. The amount or rate of under-blocking may be a gauge of whether an access rule is too liberal. Policy simulation may also allow for an evaluation of access restriction to a specific resource by a user or user group defined with the access rule based on the specific criteria in the access rule. The amount or rate of over-blocking may be a gauge of whether an access rule is too restrictive.

Policy simulation may allow an evaluation of the impact of precedence order of defined access rules to gauge whether a particular precedence order of access rules produce the desired effect and whether changing the precedence order reduces the discrepancies between the actual outcome and the desired effect. Policy simulation may also allow an evaluation of the impact of an access rule change to gauge whether an outcome of the access rule change produces the desired effect. For example, an SA 50 may view, on a security console of an administration computer, simulated log events stored in simulation log files and may aggregate statistics related to over-blocking or under-blocking for associated access rules so that SA 50 may change either the precedence order or a simulated access rule and may observe the actual outcome associated with the change.

Figure 4:
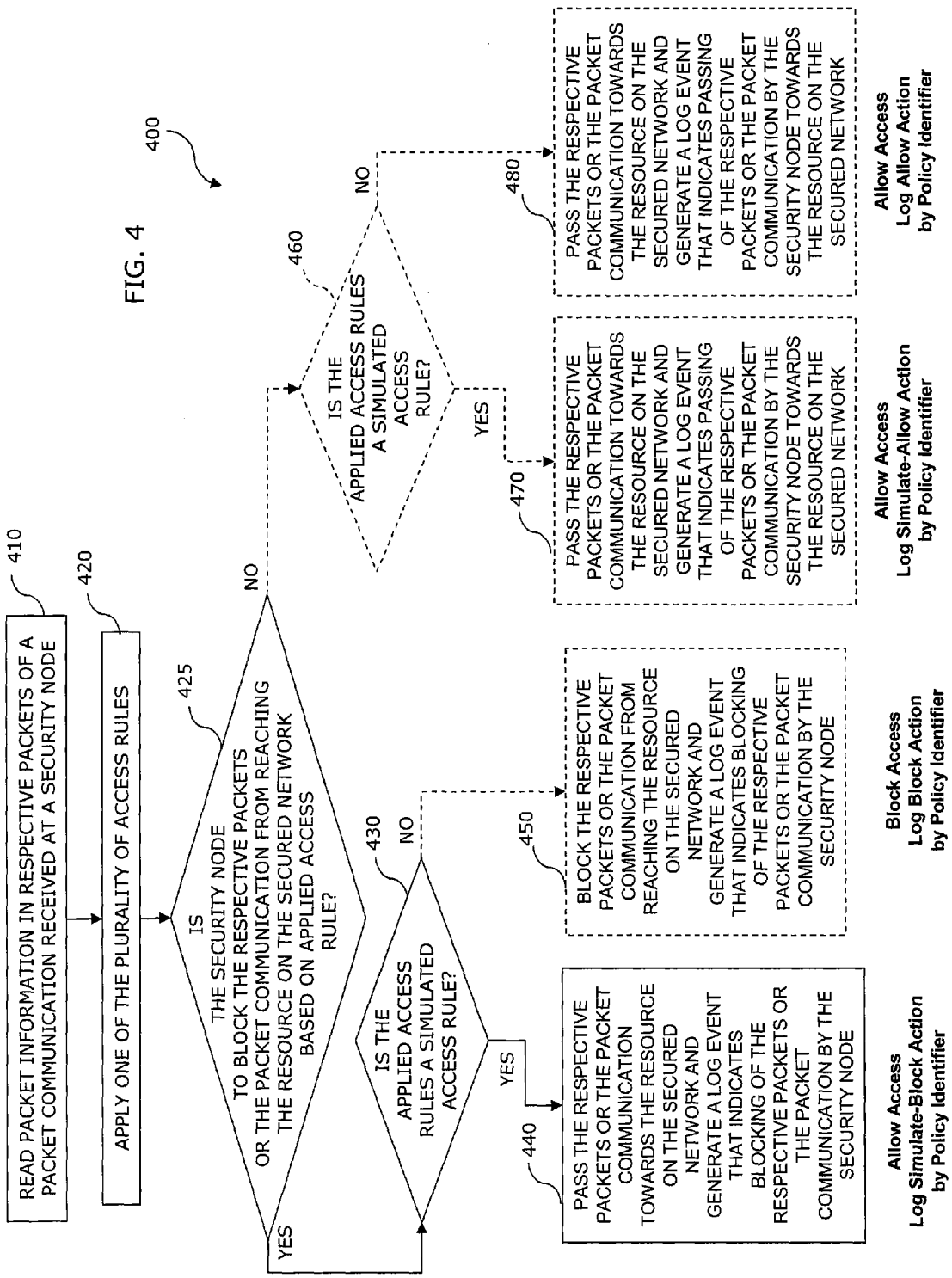
FIG. 4 is a flow chart illustrating a method of managing active and simulated policies to provide selective access to protected resources in accordance with another exemplary embodiment of the invention.

FIG. 4 is a flow chart illustrating a method of managing currently active access rules and simulated access rules to provide selective access to protected resources in accordance with another exemplary embodiment of the invention.

Now referring to FIG. 4, at block 410, packet information in respective packets of a packet communication received at security node 35 may be read. At block 420, one of the plurality of access rules is applied. That is, based on the established precedence order of the access rules, security node 35 may compare each access rule in the precedence order to the packet information read from the respective packets of the packet communication to determine which access rules apply to the packet information. For example, the packet information may include a user ID, a client ID and/or an application ID. Such packet information may be matched to criteria in respective access rules. If a match exists, the particular access rule may be applied to either allow or block access to a protected network resource 85.

In certain exemplary embodiments, SA 50 may establish or authorize automatic establishment of: (1) currently active access rules; (2) simulated access rules; and (3) a precedence order among the established currently active access rules and the established simulated access rules.

The precedence order of the established currently active access rules and simulated access rules may be changed to reduce an amount or a rate associated with over-blocking or under-blocking by: (1) generating, by SA 50, expected events indicating passing or blocking of respective packets or the packet communication received by security node 35; (2) checking the expected events with actual log events generated from the passing or the blocking of respective packets or the packet communication received by security node 35; and (3) adjusting the precedence order of the established currently active access rules and simulated access rules to reduce discrepancies between the expected events and the actual log events. In certain exemplary embodiments, the actual log events, which are checked with the expected events generated by SA 50, may be generated for use in the checking step without user intervention by aggregating log events (e.g., log events having a common user and either: (1) attempting to but not gaining access to one or more protected resources 85; or (2) actually gaining access to the one or more protected resources 85 on protected network 45. In various exemplary embodiments the adjusting and checking operations associated with changing a precedence order may be repeated until the actual log events generated matches the expected events.

In certain exemplary embodiments, one or more simulated access rules may be changed to reduce the amount of over-blocking or under-blocking by: (1) generating, by SA 50, expected events indicating passing or blocking of respective packets or the packet communication received by security node 35; (2) checking the expected events with actual log events generated from the passing or the blocking of respective packets or the packet communication received by security node 35; and (3) modifying, by security node 35, the one or more simulated access rules to reduce discrepancies between the expected events and actual log events. In various exemplary embodiments, the adjusting and modifying operations associated with modifying a simulated access rule may be repeated until the actual log events generated matches the expected events.

Although changing of the precedence order and modifying simulated access rules are illustrated as separate operations, it is contemplated that these operations may occur together.

In certain exemplary embodiments, a simulated access rule may be automatically authorized as a currently active access rule responsive to the actual log events automatically generated matching the expected events generated by SA 50. In other exemplary embodiments, SA 50 may explicitly authorize currently active access rules.

At block 425, security node 35 may determine whether to block the respective packets or the packet communication from reaching one or more of protected network resources 85 on protected network 45 based on the applied access rule. If security node 35 determines to block the respective packets or the packet communication, at block 430, security node 35 may further determine whether the applied access rule is a simulated access rule. At block 440, if the applied access rule is a simulated access rule, the respective packets or the packet communication may be passed towards protected network resources 85 on protected network 45 and a log event may be generated that indicates simulated blocking of the respective packets or the packet communication by security node 35.

At block 425, if security node 35 determines to block the respective packets or the packet communication based on the applied access rule and, at block 430, if the applied access rule is not a simulated access rule (e.g., is a currently active access rule), at optional block 450, the respective packets or the packet communication may be blocked from reaching protected network resources 85 on protected network 45 and a log event may be generated that indicates blocking of the respective packets or the packet communication by security node 35.

At block 425, if security node 35 determines not to block the respective packet or packet communication from reaching (e.g., to allow the respective packet or the packet communication to reach) one or more protected network resources 85 on protected network 45, at optional block 460, it may be determined whether the applied access rule is a simulated access rule. At optional block 460, if the applied access rule is a simulated access rule, at optional block 470, the respective packets or the packet communication may be passed towards one or more protected network resources 85 on protected network 45 and a log event may be generated that indicates simulated passing of the respective packets or packet communication by security node 35 towards one or more protected network resources 85 on protected network 45.

At block 425, if security node 35 determines not to block the respective packets or the packet communication and, at optional block 460, the applied access rule is not a simulated access rule (e.g., is a currently active access rule), at optional block 480, the respective packets or the packet communication may be passed towards one or more protected network resources 85 on protected network 45 and a log event may be generated that indicates passing of the respective packets or the packet communication by security node 35 towards one or more protected network resources 85 on protected network 45.

Each of the access rules associated with security node 35 may be set to one of: (1) a simulation mode in which access is granted to protected network resource on the protected network and an effect of the respective access rule on the packet communication is simulated in log events or (2) an active mode in which access to protected network resource is selectively granted or selectively denied to the packet communication in accordance with a currently active access rule. Each of the log events generated may be stored in log server 75 and the information stored may include an access rule identifier of the applied access rule. By providing the access rule identifier, SA 50 or administration console 60 may check whether a particular access rule identified by the access rule identifier is or was a simulated access rule at the time the log event was generated.

Although block 425 is shown as occurring before blocks 430, and 460, it is contemplated that these blocks may be reversed in order such that the determination of a simulated access rule occurs prior to the determination of whether the security node is to block the respective packets or the packet communication.

Inline network access control (NAC) solutions may enforce access policies (rules) to allow or to block access to intranet or enterprise data center resources (i.e., services or applications, among others that are protected by a policy enforcement point (PEP) or security node) by users (either local end-users, remote end-users, and/or client applications). The effectiveness of provisioned policies or rules may be determined based on the outcome of access rule evaluation and enforced by an appropriate security node, network device or PEP.

Policy simulation in an online production network provides means for gauging consequences of an access policy or rule introduced in the traffic flow. Policy simulation allows such a gauge without changes in access to protected resources. This may allow security or policy administrators to observe the consequences of an access rule, if it where currently active (i.e., activated), on traffic flow and resource access.

When security node 35 has only simulated accesses rules associated with it (for example, during startup of security node 35), simulated operation (i.e., simulated blocking of the respective packets or the packet communication from one or more protected network resources 85 or simulated passing of the respective packets or the packet communication towards one or more protected network resources 85) of security node 35 may be analyzed. That is, simulated operation of security node 35 may occur without affecting the flow of network traffic on network 45.

Certain embodiments of the present invention may include some or all of the following features.

a) The security node or PEP may determine based an evaluation of a portion or all of the access rule policies configured (authorized), whether a requested access to a protected resource may be granted or denied.

b) If the simulation mode is activated for a specific access rule, and the outcome of the access rule evaluation is a block action caused by the access rule, an event indicating the simulated blocking action may be logged to a log server to provide a record of the simulated blocking action triggered at the security node or PEP by the simulation policy, and access may be granted.

c) The simulation mode may also be activated at the security node or PEP level to operate the security node in an audit mode (i.e. without blocking any access to protected resources). In the audit mode, all access rules associated with the security node or PEP may operate in the simulation mode to provide a means to observe patterns of access and infer policy based on generated simulation logs.

d) Security tag information embedded in some or all of the data packets passing to the security node or PEP may be read by the security node or PEP and may be compared with the actual or simulated policies to produce a desired effect (i.e., blocking or passing of some or all of the data packets passing to the security node or PEP.

In various exemplary embodiments described herein, policy simulations may be based on security tags embedded in data packets. Such security tags are disclosed in U.S. patent Ser. No. 10/583,578, the contents of which are incorporated by reference. By using packet information associated with such security tags. A highly granular level of access rule simulation may be possible. Such policy simulation may be based on criteria within the packet information, for example: (1) a user identifier; (2) a user role; (3) an application identity; an access rule identifier; time and date stamps; and/or (4) application protocol information, among many others. Each criteria may be individually (atomically) applied at an access policy/rule level. The ability to gauge and audit the value and effect of an access rule or precedence order change in the data path may assist in risk mitigation, for example, in mission critical production environments and other environments where actual outcomes are desired to be deterministic and to be understand prior to implementation in the production environments.

Although several portions of the system are described as Plugins, it is contemplated that these portions may be standalone software applications or may be a combination of hardware and software.

As described herein, for example, the invention may be embodied in software (e.g., a Plugin or standalone software), in a machine (e.g., a computer system, a microprocessor based appliance, etc.) that includes software in memory, or in a tangible computer storage medium configured to carry out the access control schema (e.g., in a self contained silicon device, a solid state memory, an optical disc, a magnetic disc, etc.).

Although the invention is illustrated and described herein with reference to specific embodiments, the invention is not intended to be limited to the details shown. Rather, various modifications may be made in the details within the scope and range equivalents of the claims and without departing from the invention.

We claim:

1. A method of managing access to resources on a secured network using a plurality of access rules, comprising
reading packet information in respective packets of a packet communication received at a security node;
applying an access rule of the plurality of access rules;
determining whether the security node is to block the respective packets or the packet communication from reaching one or more of the resources on the secured network based on the applied access rule;
if (i) the applied access rule is a simulated access rule and (ii) the security node is to simulate blocking the respective packets or the packet communication from reaching the one or more resources based on the applied simulated access rule, the security node:
(1) passing the respective packets or the packet communication towards the one or more resources on the secured network; and
(2) generating a log event that indicates blocking of the respective packets or the packet communication by the security node, and changing the simulated access rule or an order of the access rules to reduce an amount of over-blocking or under-blocking determined based on the log event, wherein over-blocking occurs if appropriate access to a protected resource is blocked by an access rule, and under-blocking occurs if inappropriate access to a protected resource is not blocked by the access rule.

2. The method of claim 1, further comprising:
setting each of the access rules to one of: (1) a simulation mode in which access is granted to the one or more resources on the secure network and an effect of the respective access rule on the packet communication is simulated in log events or (2) an active mode in which access to the one or more resources is selectively granted to the packet communication in accordance with a currently active access rule.

3. The method of claim 1, wherein when the respective packets or the packet communication are not to be blocked from reaching the one or more resources on the secured network, and the applied access rule is the simulated access rule,
(1) passing the respective packets or the packet communication towards the one or more resources on the secured network; and
(2) generating the log event that indicates passing of the respective packets or the packet communication by the security node towards the one or more resources of the secured network.

4. The method of claim 1, wherein when the respective packets or the packet communication are to be blocked from reaching the one or more resources on the secured network, and the applied access rule is a currently active access rule, (1) selectively blocking, by the security node, the respective packets or the packet communication from reaching the one or more resources on the secured network in accordance with the applied access rule; and (2) generating the log event that indicates blocking of the respective packets or the packet communication by the security node.

5. The method of claim 1, wherein when the respective packets or the packet communication are to not be blocked from reaching the one or more resources on the secured network, and the applied access rule is a currently active access rule, (1) selectively passing, by the security node, the respective packets or the packet communication towards the one or more resources on the secured network in accordance with the currently active access rule; and (2) generating the log event that indicates passing of the respective packets or the packet communication by the security node.

6. The method of claim 1, further comprising:
establishing, by a system administrator, a set of currently active access rules and another set of simulated access rules;
setting a precedence order among the established currently active access rules and the established simulated access rules.

7. The method of claim 6, further comprising:
changing the precedence order of the established currently active and simulated access rules to reduce an amount of over-blocking or under-blocking.

8. The method of claim 7, wherein the changing of the precedence order includes:
generating, by the system administrator, expected events indicating passing or blocking of respective packets or the packet communication received by the security node;
checking the expected events with actual log events generated from the passing or the blocking of respective packets or the packet communication received by the security node;
adjusting the precedence order of the established currently active and simulated access rules to reduce discrepancies between the expected events and the actual log events.

9. The method of claim 8, further comprising:
generating, without user intervention, the actual log events by aggregating actual log events having a common user and attempting to or gaining access to the one or more resources on the secured network prior to the checking of the expected events with the actual log events.

10. The method of claim 9, wherein the adjusting and checking are repeated until the actual log events generated match the expected log events.

11. The method of claim 1, further comprising:
changing one or more simulated access rules to reduce an amount of over-blocking or under-blocking.

12. The method of claim 11, wherein the changing of the one or more simulated access rules includes:
generating, by the system administrator, expected events indicating passing or blocking of respective packets or the packet communication received by the security node;
checking the expected events with actual log events generated from the passing or the blocking of respective packets or the packet communication received by the security node; and modifying, by the security node, the one or more simulated access rules to reduce discrepancies between the expected events and actual log events.

13. The method of claim 12, further comprising;
generating, without user intervention, the actual log events by aggregating actual log events having a common user and attempting to or gaining access to the one or more resources on the secured network prior to the checking of the expected events with the actual log events.

14. The method of claim 13, wherein the adjusting and modifying are repeated until the actual log events generated match the expected events, the method further comprising authorizing use of one or more simulated access rules responsive to the actual log events generated matching the expected events.

15. The method of claim 13, further comprising:
establishing only simulated accesses rules for the security node; and
analyzing simulated operation of the security node for blocking of the respective packets or the packet communication from the one or more resources or for passing the respective packets or the packet communication towards the one or more resources in accordance with the established simulated access rules for the security node.

16. The method of claim 1, wherein the determining whether the security node is to block or to pass the respective packets or the packet communication includes
analyzing security information embedded in the respective packets that are read and criteria in the applied access rule to determine whether each respective packet read or the packet communication associated therewith is to be passed by the security node towards the one or more resources, the method further comprising:
blocking the respective packets or the packet communication from reaching the one or more resources when access is not granted based on a currently active access rule.

17. A method of managing access to resources on a secured network, comprising
reading packet information in respective packets of a packet communication received at a security node;
applying, by a program processor of the security node, a simulated access rule;
determining, by the program processor of the security node, whether the packet communication is authorized for one or more resources on the secured network using packet information in at least one of the respective packets and the applied, simulated access rule;
responsive to the packet communication not being authorized by the simulated access rule, generating a log event indicating that the packet communication is simulated to be blocked by the security node; and
changing the simulated access rule to reduce an amount of over-blocking or under-blocking determined based on the log event, wherein over-blocking occurs if appropriate access to a protected resource is blocked by an access rule, and under-blocking occurs if inappropriate access to a protected resource is not blocked by the access rule.

18. The method of claim 17, further comprising
passing, by the security node, the packet communication towards the one or more resources on the secured network.

19. The method of claim 17, further comprising:
analyzing the packet information in the respective packets using one or more access rules to determine whether: (1) the respective packets or the packet communication is to be selectively passed by the security node towards the one or more resources on the secured network; or (2) the respective packets or the packet communication is to be selectively blocked by the security node from reaching the one or more resources on the secured network, responsive to the one or more access rules being currently active access rules.

20. A method of simulating an effect of access policies for managing access to a resource on a protected network, comprising,
   generating, by an administrator, a simulated rule or a set of simulated rules having a precedence order;
   authorizing use of the simulated rule or set of simulated rules at an enforcement point;
   generating log events at the enforcement point including: (1) simulating blocking of respective packets when the simulated rule or set of simulated rules provide for blocking of the respective data packets based on the analysis step; or (2) simulating transmission of respective packets when the simulated rule or set of simulated rules provide for access to the protected resource;
   analyzing the generated log events to determine an amount of over-blocking or under-blocking, wherein over-blocking occurs if appropriate access to a protected resource is blocked by an access rule, and under-blocking occurs if inappropriate access to a protected resource is not blocked by the access rule;
   changing either the precedence order or the simulated rule to reduce the amount of over-blocking or under-blocking; and
   placing the simulated rule into service on the enforcement point as an actual rule.

21. A security node for managing access to a resource on a secured network using a plurality of access rules, comprising a packet processor module for reading packet information in respective packets of a packet communication received at the security node;
   a rule enforcement unit for applying the plurality of access rules in a precedence order and for determining whether the security node is to block the respective packets or the packet communication from reaching the resource on the secured network based on an applied access rule of the plurality of access rules,
   an event logger for generating log events, and
   wherein if (i) the rule enforcement unit determines that the applied access rule is a simulated access rule and (ii) the security node is to simulate blocking the respective packets or the packet communication from reaching the resource based on the applied simulated access rule:
   (1) the packet processor passes the respective packets or the packet communication towards the resource on the secured network; and
   (2) the event logger generates a respective log event that indicates blocking of the respective packets or the packet communication by the security node, the precedence order or the simulated access rule changed to reduce an amount of over-blocking or under-blocking determined based on the log event, wherein over-blocking occurs if appropriate access to a protected resource is blocked by an access rule, and under-blocking occurs if inappropriate access to a protected resource is not blocked by the access rule.

22. A non-transitory computer readable storage medium storing computer code executable on a computer to implement the method of claim 1.

\* \* \* \* \*